Aug. 21, 1928.

W. H. PIGG 1,681,681

SEED POTATO CUTTER

Filed Feb. 5, 1927   2 Sheets-Sheet 1

Inventor

Wharton H. Pigg,

By Clarence A. O'Brien
Attorney

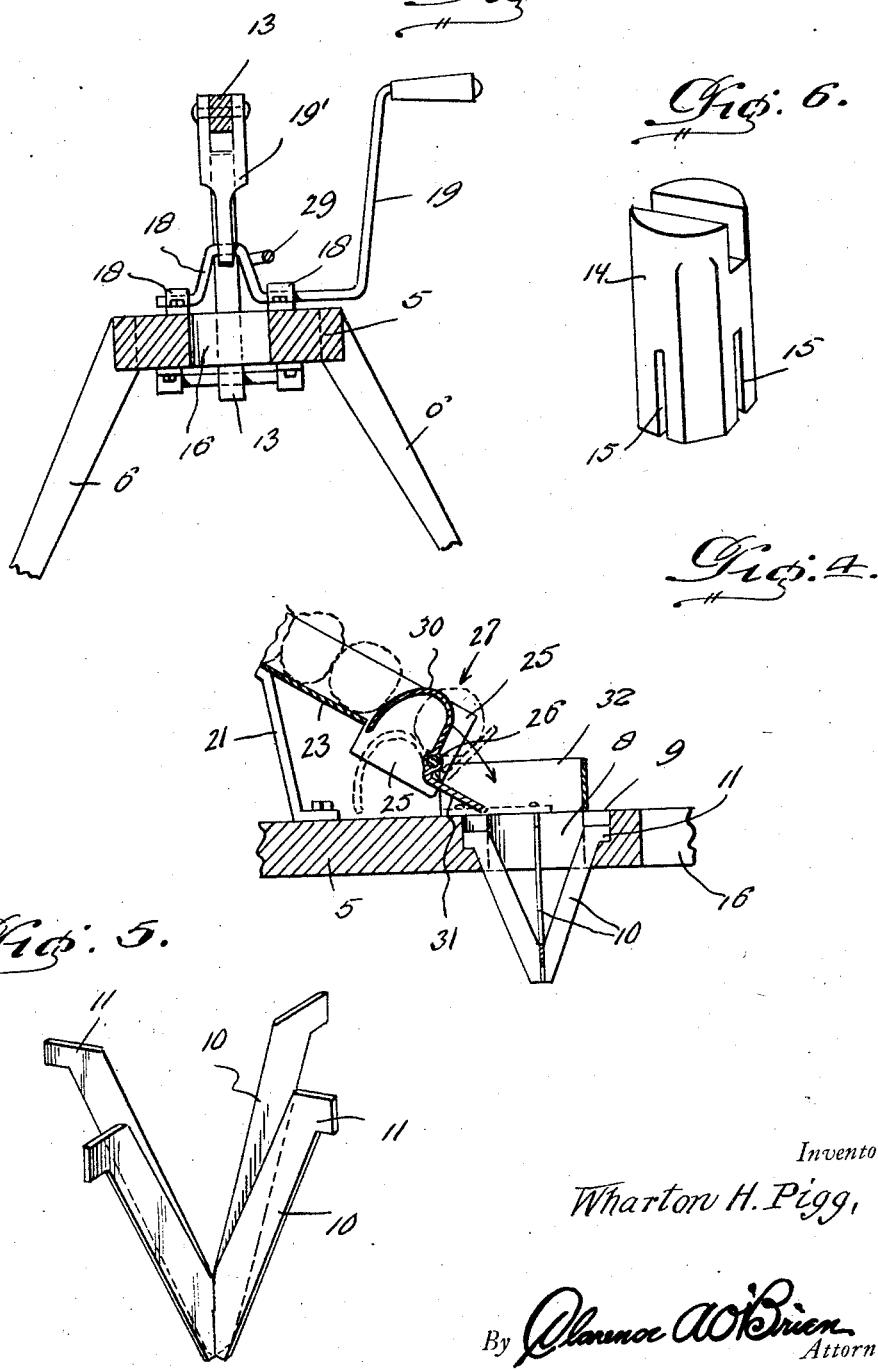

Patented Aug. 21, 1928.

1,681,681

UNITED STATES PATENT OFFICE.

WHARTON H. PIGG, OF CANON CITY, COLORADO.

SEED-POTATO CUTTER.

Application filed February 5, 1927. Serial No. 166,186.

This invention relates to new and useful improvements in seed potato cutters, and has for its primary object to provide a novel, simple, and efficient device for use in the cutting of seed potatoes, the device being so constructed as to permit of the rapid and smooth cutting of the potatoes in substantially uniformly shaped cubes so that they may be properly planted by reason of conventionally constructed planting machines.

A further and important object is to provide a device of this character including a cutter unit together with means for forcing a single potato through the unit, the invention further comprising means for feeding a single potato to the cutter every time the pressing means is raised, and this regardless of the rapidity of operation of the device.

Other objects will become apparent as the nature of the invention is better understood, the same comprising the novel form, combination, and arrangement of parts hereinafter more fully described, shown in the accompanying drawings and claimed.

In the drawings wherein like reference characters indicate corresponding parts of the invention throughout the several views:

Figure 3 is a vertical section taken substantially upon the broken line 3—3 of Figure 1.

Figure 4 is an enlarged fragmentary horizontal section through the cutting unit and the potato feeding device therefor.

Figure 5 is a perspective of the cutting unit, and

Figure 6 is a perspective of the pressing unit for forcing the potatoes through the cutting unit.

Figure 1:
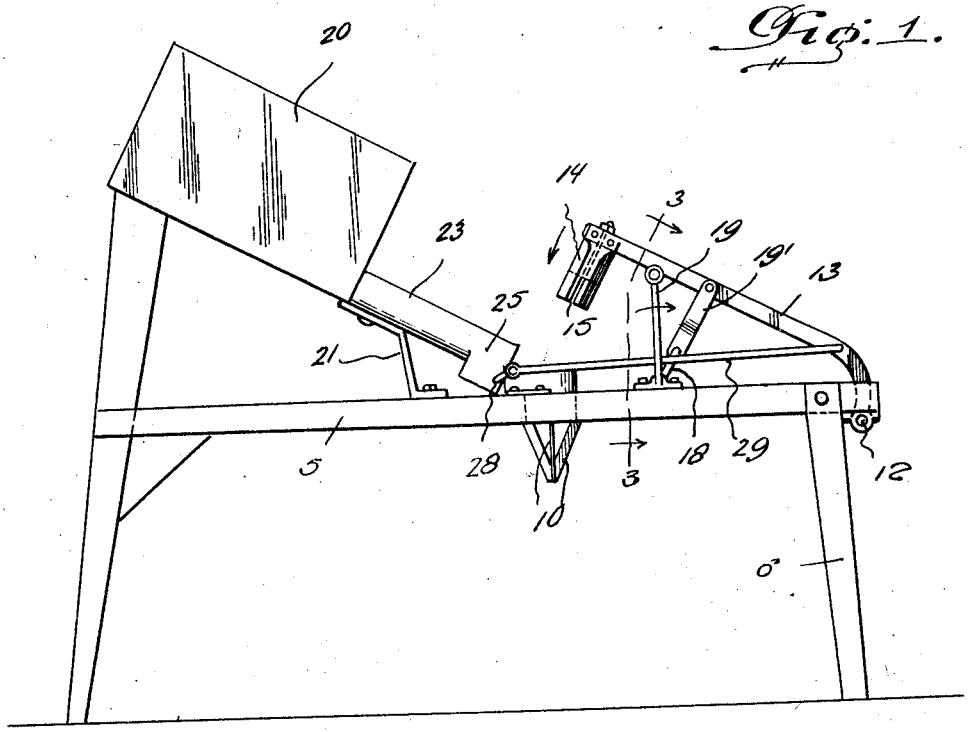
Figure 1 is a side elevation of a seed potato cutter constructed in accordance with the present invention.
Figure 2:
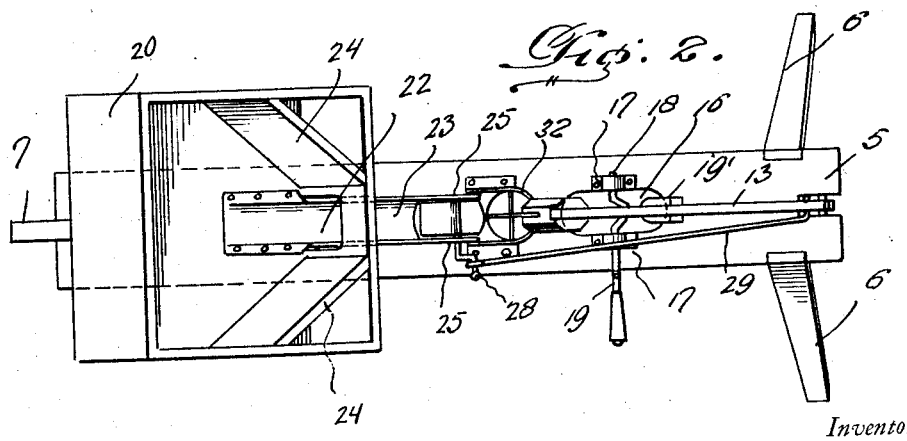
Figure 2 is a top plan view thereof.

Now having particular reference to the drawings, my novel cutter consists of a relatively narrow table board 5 supported at its forward end by outwardly diverging legs 6—6 and at its rear end by an inclined leg 7, the upper end of which terminates considerably above the top of the board 5 as in Figure 1. Intermediate the ends of the board 5 the same is formed with a circular opening 8 within the upper edge of which are formed four equally spaced slots 9. Arranged dependently through this opening 8 is a cutter unit that consists of a pair of V-shaped cutter blades 10—10 that are arranged in interlocking engagement at their apices and that are formed at the upper ends of their legs with laterally outwardly directed lugs 11 for fitting within the slots 9 of said opening 8 for maintaining the blades at direct right angles with respect to each other and as clearly indicated in the top plan view of Figure 2, and also in the perspective view, Figure 5.

As clearly disclosed in this latter mentioned figure, the inner edges of these blades are sharpened for facilitating the proper cutting of a potato as the same is forced therethrough in a manner hereinafter more fully described.

Pivotally secured to the forward end of the board 5 as at 12 is the down-turned end of a relatively elongated arm 13 to the inner end of which is rigidly secured a depending plunger 14 formed at its lower end with a pair of longitudinal cross slots 15—15, the length of the arm 13 being such that when the same is swung downwardly in the direction of the arrow in Figure 1, said plunger will pass through the opening for forcing a potato resting upon the blades through the blades, the cross slots 15—15 being provided for the purpose of receiving the blades in order that the plunger may pass therebeyond for obviously forcing the four parts of the cut potato entirely through the blades.

At the front of the blade carrying opening 8 of the board 5, said board is provided with an elongated opening 16, while at opposite sides thereof are bearings 17—17 within which is rotatably mounted a crank shaft 18 carrying at its outer end a hand crank 19. Pivotally interconnecting the crank portion of the shaft 18 and the plunger carrying arm 13 is a suitable link 19', with the end in view that the rotation of the shaft will cause the pivotal movement of the arm 13 so as to move the plunger 14 into and out of engagement with the cutting blades 10—10.

Supported at one end by the upper end of the inclined leg 7 of the table board 5 is an inclined potato hopper 20 also supported at its lower front end by a bracket 21 secured to the board 5 and the bottom of said hopper. The front end of said hopper 20 at the bottom wall thereof is formed with a discharge opening 22 in communication with and below which is a semi-circular chute 23. Arranged within the hopper 20 at opposite sides of the opening 22 are guide boards 24—24 that converge inwardly toward the opening 22 so as to guide the potatoes therethrough.

The end of the chute 23 terminates in slight spaced relation with the blade carrying opening 8 of the table board 5, while said chute is formed at this end so as to provide a pair of parallel side wings 25—25. Arranged transversely between these side wings 25—25 adjacent to their forward lower corners is a shaft 26, upon which is keyed a combined potato stop and feeding member 27. One end of the shaft 26 carrying said member 27 is provided with a crank 28, Fig. 1 while interconnecting this crank and the plunger carrying arm 13 is a link bar 29 for the purpose of moving the shaft 26 together with the member 27 in reverse direction simultaneously with the up and down movement of the arm 13.

The member 27 is in the form of a metallic plate so bent as to provide at one side of the shaft 26 a curved head 30, and at the opposite side of said shaft, a plano plate 31 at direct right angles to the portion of the head 30 adjacent to said shaft 26. When in the full line position of Figure 4 the potatoes within the chute 23 will be held from passing into the cutter carrying opening 8 of the table board 5. The connection between the member 27 and arm 13 is the full line that when the member 27 is in such position the plunger 14 is within the opening 8 and in the act of forcing a potato through the blades. However, simultaneously with the raising of the plunger 14 the member 27 will be thrown into the dotted line position of Figure 4 so as to permit one of the potatoes to roll over the head 30 and be caught by the plate 31. As soon as the member 27 is moved to its full line position in Figure 4 the potato that has been caught by the plate 31 will be discharged into the opening 8 to rest upon the blade so that the same will be forced therethrough at the next movement of the plunger 14 into said opening.

For preventing any liability of the potatoes rolling over the opening 8 there is arranged therearound a collar 32 open at its inner side so as not to interfere with the movement of the feeding and delivering member 27.

In view of the foregoing description when considered in conjuction with the accompanying drawings, it will at once be apparent that I have provided a highly novel, simple, and efficient seed potato cutter that is well adapted for all the purposes heretofore designated, even though I have herein shown and described the invention as consisting of certain detail structural elements it is nevertheless to be understood that some changes may be made therein without effecting the spirit and scope of the appended claims.

Having thus described the invention what I claim is:—

1. The combination in a potato cutter, of a table board having a vertical opening therein, cutting means in said opening, an inclined chute with its lower discharge end spaced above and to one side of said opening, spaced guide wings disposed vertically and arranged between said lower end of the chute and said opening, a transverse shaft journaled in said side wings, means for turning said shaft, and a feed control member including a loop shaped portion at one side of said shaft and movable between said wings above and below the lower end of the chute and also including a plate-like portion adapted in its upper position to check potatoes and in its lower position to shoot a potato to said opening.

2. The combination in a potato cutter, of a table board having a vertical opening therein, cutting means in said opening, an inclined chute with its lower discharge end spaced above and to one side of said opening, spaced vertically disposed side wings between said lower end of the chute and said opening, a transverse shaft journaled in said side wings, a feed control member including a loop shaped portion at one side of said shaft and movable between said wings above and below the lower end of the chute and also including a plate-like portion adapted in its upper position to check potatoes and in its lower position to shoot a potato to said opening, movable means for forcing potatoes past the blades of the cutter unit, and a connection between said movable means and said shaft for the turning of the latter.

In testimony whereof I affix my signature.

WHARTON H. PIGG.